United States Patent
Erdogan et al.

(10) Patent No.: US 9,547,178 B2
(45) Date of Patent: Jan. 17, 2017

(54) DICHROIC IMAGE SPLITTER

(75) Inventors: Turan Erdogan, Spencerport, NY (US); Ligang Wang, Cupertino, CA (US); Prashant Prabhat, Rochester, NY (US)

(73) Assignee: Semrock. Inc., Rochester, NY (US)

( * ) Notice: Subject to any disclaimer, the term of this patent is extended or adjusted under 35 U.S.C. 154(b) by 739 days.

(21) Appl. No.: 13/585,886

(22) Filed: Aug. 15, 2012

(65) Prior Publication Data

US 2014/0049630 A1    Feb. 20, 2014

(51) Int. Cl.
| | |
|---|---|
| G02B 27/14 | (2006.01) |
| G02B 27/10 | (2006.01) |
| G02B 5/26 | (2006.01) |
| G02B 5/28 | (2006.01) |

(52) U.S. Cl.
CPC ............ *G02B 27/1013* (2013.01); *G02B 5/26* (2013.01); *G02B 5/285* (2013.01); *G02B 27/141* (2013.01)

(58) Field of Classification Search
CPC ........... G02B 5/28; G02B 5/285; G02B 5/286; G02B 5/287; G02B 5/288; G02B 27/10; G02B 27/12; G02B 27/14; G02B 27/141; G02B 27/142; G02B 27/149; G02B 27/1006; G02B 27/1013
USPC .......... 359/487.04, 583, 577, 580, 586, 588, 359/589, 590, 629, 634, 636, 638, 639, 359/640
See application file for complete search history.

(56) References Cited

U.S. PATENT DOCUMENTS

| | | | |
|---|---|---|---|
| 1,319,292 A | 10/1919 | Kunz | |
| 2,740,317 A * | 4/1956 | Kelly | G02B 5/285 352/66 |
| 2,945,413 A * | 7/1960 | Kelly | 359/583 |
| 3,905,684 A | 9/1975 | Cook et al. | |
| 4,268,119 A | 5/1981 | Hartmann | |
| 4,889,426 A * | 12/1989 | Faltermeier | G02B 21/0096 356/219 |
| 4,933,751 A | 6/1990 | Shinonaga et al. | |
| 5,926,283 A | 7/1999 | Hopkins | |
| 5,982,497 A | 11/1999 | Hopkins | |
| 6,441,972 B1 | 8/2002 | Lesniak et al. | |
| 7,612,822 B2 | 11/2009 | Ajito et al. | |
| 7,649,626 B2 | 1/2010 | Harvey et al. | |
| 7,868,936 B2 | 1/2011 | Ajito et al. | |
| 8,081,311 B2 | 12/2011 | Themelis | |
| 2007/0132955 A1 | 6/2007 | Suzuki et al. | |
| 2008/0055716 A1* | 3/2008 | Erdogan et al. | 359/359 |
| 2009/0244717 A1 | 10/2009 | Tocci | |
| 2010/0007852 A1* | 1/2010 | Bietry | G03B 21/28 353/8 |
| 2012/0050877 A1* | 3/2012 | Saita | 359/634 |
| 2013/0208146 A1* | 8/2013 | Cotton | H04N 5/2254 348/239 |

* cited by examiner

*Primary Examiner* — Scott J Sugarman
*Assistant Examiner* — Gary O'Neill
(74) *Attorney, Agent, or Firm* — Louis S. Horvath

(57) ABSTRACT

An optical image splitter disposed in the path of image-bearing light along an optical axis has a coated dichroic surface disposed at an angle of 15 degrees or less relative to incident light along the optical axis. The coated dichroic surface has a number of layers of material, the of layers including layers having a first refractive index, $n_L$, and layers having a second refractive index, $n_H$, greater than the first refractive index. The coated surface transmits light of at least a first wavelength range to form a first image at an image plane and reflects light of a second wavelength range to form a second image at the image plane.

19 Claims, 13 Drawing Sheets

DICHROIC IMAGE SPLITTER

FIELD OF THE INVENTION

This invention generally relates to apparatus and methods for distinguishing image content according to wavelength and more particularly to a dichroic image splitter for spectral separation of image-bearing light.

BACKGROUND OF THE INVENTION

Thin film interference filters are widely used in systems for optical measurement and analysis, such as Raman spectroscopy and fluorescence imaging, for example. Thin film interference filters, including optical edge filters, notch filters, and laser line filters (LLFs) are advantageously used in such systems to transmit light having specific wavelength bands and to block unwanted light that could otherwise constitute or generate spurious optical signals and swamp the signals to be detected and analyzed. Dichroic beam splitters utilize interference filter effects to reflect certain wavelengths or ranges of wavelengths and transmit other wavelengths or ranges of wavelengths. Failure or poor performance of such filters compromises the performance of systems in which they are used. Conventional design approaches for optical instruments that utilize thin-film filters are often constrained by inherent characteristics of these filters and long-standing practices for how these filters are designed and used.

As an example of one type of system that relies heavily on thin-film filters and benefits from high performance filter design, the simplified schematic diagram of FIG. 1 shows one type of imaging apparatus that is used for analysis of spectral characteristics of a sample. A fluorescence microscopy system 10 has a light source 12 with an illumination lens L2 that directs a beam of excitation energy, within a specific wavelength range, toward a sample 20 for analysis. Optical fluorescence occurs when absorption of light of the excitation wavelength(s) causes emission of light at one or more longer wavelengths. A succession of filters 22, 24, and a beam splitter 26 are used to isolate the different wavelength bands of light from sample 20 through lens L1 to their appropriate paths, through lens L3, so that the desired emitted signal content, which can be at orders of magnitude lower than the excitation energy, can be properly sensed at a detector 30, such as a camera or charge-coupled device (CCD).

The detection problem becomes more complex when there are multiple emission wavelengths, such as where multiple fluorophores are used within the sample or multiple lines are detected in Raman spectroscopy. The simplified schematic diagram of FIG. 2A shows a fluorescence microscopy system 50 that uses a beam splitter 52 as an image splitter to provide an image of a first wavelength band to a first detector 60 and an image of a second wavelength band to a second detector 62. Beam splitter 52 is at a 45 degree angle with respect to the propagation direction of incident light. Additional filters 56 and 58 are used to help further isolate the image content according to wavelength. Lenses L1 and L2 function as objective and illumination lenses, respectively. Lenses L5 and L6 serve to direct the image-bearing light to detectors 60 and 62.

The simplified schematic diagram of FIG. 2B shows a fluorescence microscopy system 70 that obtains two images and provides them on a single detector 30. Image-bearing light is directed from a lens L7 to a beam splitter 32 that transmits one wavelength band toward a mirror 34 and reflects the complementary wavelength band. The transmitted wavelength band reflects from mirror 34 and is directed toward a movable mirror 36, through emission filter 58, and through a lens L8 toward detector 30, forming a first image. Light of the complementary wavelength band that had been reflected from beam splitter 32 is redirected by movable mirror 36 through emission filter 56. This light also goes through lens L8 and forms a second image on detector 30.

The arrangements of components shown in FIGS. 2A and 2B provide workable solutions for separating images of first and second wavelength bands, but have a number of shortcomings. The requirement for two detectors 60 and 62 in the FIG. 2A embodiment adds cost and complexity, significantly increasing the size of the microscopy apparatus. Detectors 60 and 62 are orthogonal to each other in conventional apparatus; the proper positioning of detectors 60 and 62 requires a relatively bulky mounting arrangement. Both of the FIG. 2A and FIG. 2B embodiments add a significant number of components, increasing the cost and overall weight and bulk of the microscopy system.

Dichroic filters and, more broadly, thin-film interference filters in general are conventionally designed to provide desired behavior for light that is incident over a small range of angles, typically angles that are near normal incidence. With many thin-film designs, light behaves well at the design angle of incidence; but this behavior can degrade rapidly as the incident light varies further from the design angle of incidence. Conventional thin-film filter designs often exhibit high sensitivity to angle of incidence (AOI) and cone half angle (CHA). For this reason, conventional design practice avoids directing incident light that is at high incident angles (relative to normal) onto dichroic and other types of thin-film surfaces. This practice sets a number of constraints on how components are arranged for separating image-bearing light according to its spectral characteristics, often making it difficult to package optical components for image splitting in a compact configuration.

Thus, it can be seen that there is a need for improved dichroic image splitter approaches for use in spectroscopy, fluorescence microscopy, and other applications.

SUMMARY OF THE INVENTION

It is an object of the present invention to advance the art of separating image content according to wavelength. With this object in mind, the present invention provides apparatus and methods that enable spectral separation of image-bearing light using a single dichroic surface. Contrary to conventional teaching and practice in the optical arts, embodiments of the present invention obtain wavelength separation by disposing a dichroic surface at a grazing angle to incident light. This enables spectral separation at a favorable location in the optical path for a microscope or other instrument and allows image detectors to be adjacently disposed with respect to each other or, in some embodiments, allows a single image detector to be used for forming separate images from light over different wavelength bands.

The present invention provides an optical image splitter disposed in the path of image-bearing light along an optical axis, the image splitter comprising a coated dichroic surface disposed at an angle of 15 degrees or less relative to incident light along the optical axis, the coated dichroic surface having a plurality of layers of material, the plurality of layers including layers having a first refractive index, $n_L$, and layers having a second refractive index, $n_H$, greater than the first refractive index, wherein the coated surface transmits light of at least a first wavelength range to form a first image at an image plane and reflects light of a second wavelength range to form a second image at the image plane.

Additional features and advantages will be set forth in part in the description which follows, being apparent from the description or learned by practice of the disclosed embodiments. The features and advantages will be realized and attained by means of the elements and combinations particularly pointed out in the appended claims.

It is to be understood that both the foregoing general description and the following detailed description are exemplary and explanatory only, and are not restrictive of the scope of the embodiments as claimed.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
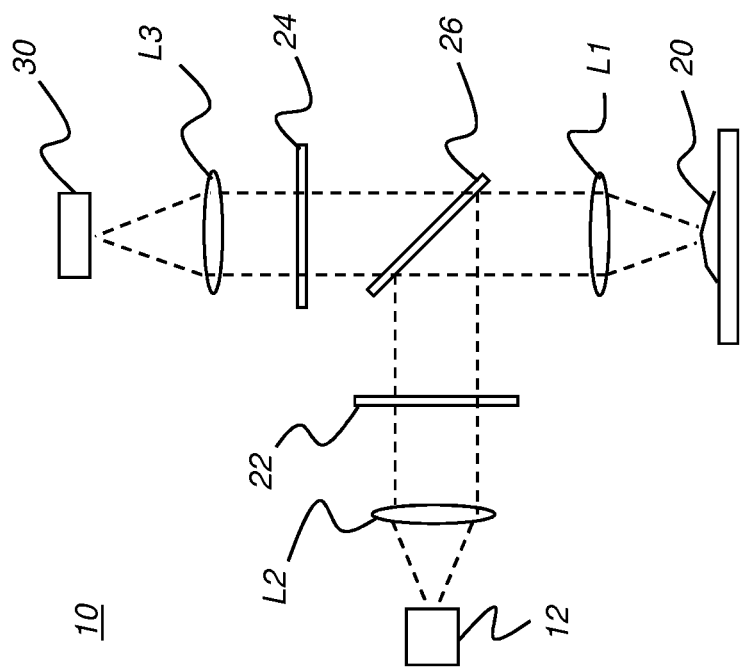
FIG. 1 is a simplified schematic diagram showing components of a conventional fluorescence microscope imaging system.

It is to be understood that elements not specifically shown or described herein may take various forms well known to those skilled in the art. Figures shown and described herein are provided in order to illustrate key principles of operation and component relationships along their respective optical paths according to the present invention and are not drawn with intent to show actual size or scale. Some exaggeration may be necessary in order to more clearly emphasize basic structural relationships or principles of operation.

Where they are used, the terms "first", "second", "third", and so on, do not necessarily denote any ordinal or priority relation, but are simply used to more clearly distinguish one element from another.

The term "oblique" is used herein to refer to an angular relationship that is other than substantially orthogonal or parallel, that is, at least about 5 degrees from any integer multiple of 90 degrees. The term "grazing angle" refers to an angle of incidence relative to a surface plane of not more than 30 degrees. Alternately stated, relative to a normal to the surface, a grazing angle is 60 degrees or more from normal.

The term "substantially parallel image planes" as used herein relates to image planes that are parallel to within no more than about +/−15 degrees.

The term "prism" or "prism element" is used herein as it is understood in optics, to refer to a transparent optical element that is generally in the form of an n-sided polyhedron with flat surfaces upon which light can be incident and that is formed from a transparent, material that refracts light that enters and exits the element. The material that forms a prism or prism element is typically solid, but may alternately comprise a liquid. It is understood that, in terms of shape and surface outline, the optical understanding of what constitutes a prism is less restrictive than the formal geometric definition of a prism and encompasses that more formal definition. In optics, for example, the term "prism" is also used in reference to a "composite" element, formed from two or more monolithic "component" prism elements that are glued or otherwise coupled together, including composite elements whose components are mechanically coupled but have a thin gap at the interface between them filled with air or epoxy, for example.

In the context of the present disclosure, the terms "configured", "treated", or "formed" are used equivalently with respect to the fabrication of thin film filters designed to provide a particular spectral characteristic. A surface is considered to be transmissive to a particular wavelength if it transmits at least 75 percent of the light that is incident at that wavelength. A surface is considered to reflect a given wavelength of incident light if it reflects at least 80 percent of the light that is incident at that wavelength.

The background section described some of the difficulties related to the design of a fluorescence or spectroscopic imaging apparatus that detects light emitted at multiple wavelengths. Embodiments of the present invention take an alternate approach to conventional methods for image splitting to obtain two images that differ according to spectral content. Embodiments of the present invention provide an optical apparatus in which either a single imaging detector can be used for obtaining both of the images or two imaging detectors, adjacent to each other and in substantially the same plane or in substantially parallel planes, rather than orthogonal to each other, can be used for this purpose.

Figure 2A:
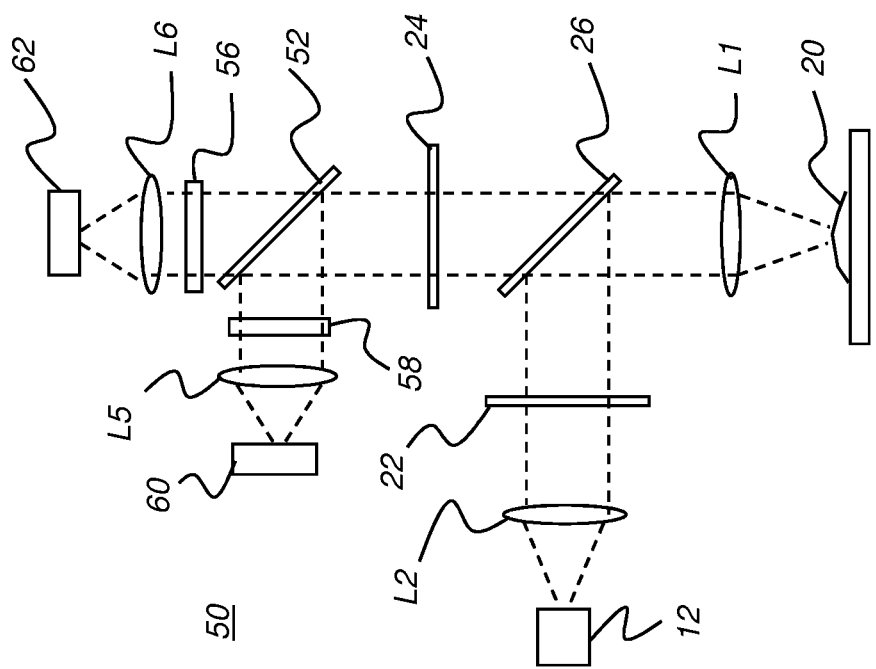
FIG. 2A is a simplified schematic diagram showing components of a conventional fluorescence microscope imaging system having two detectors.
Figure 2B:
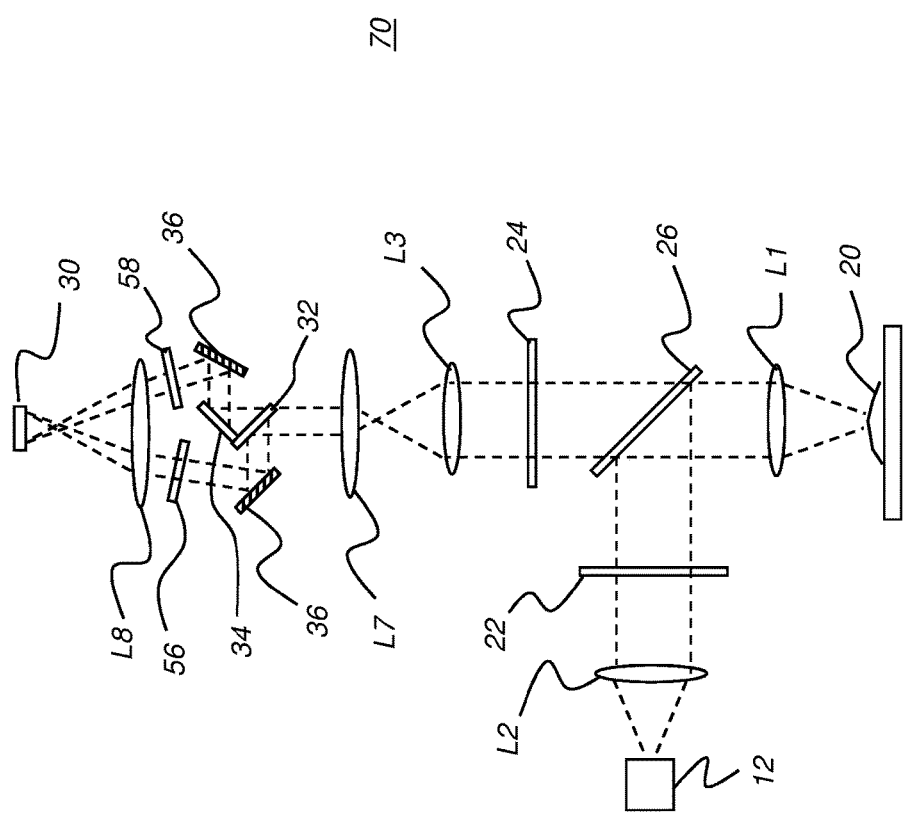
FIG. 2B is a simplified schematic diagram showing a conventional fluorescence microscope imaging system that forms two images on a single detector.

As noted in the background section, interference filters are conventionally designed for light incident over a small range of angles, typically with the light propagation direction at near normal incidence. As incident light varies further from normal incidence, the performance of the filter with wavelength can change significantly. For example, even the 45 degree angle of incidence shown in the example of FIG. 2A is less than optimal for obtaining very high performance levels of dichroic wavelength response. Where the light is not reasonably well collimated, such as with light at larger cone angles, some amount of leakage of unwanted light can occur in either the path of reflected light or the path of transmitted light. Dichroic surfaces are thus typically not used with light incident at angles less than about 30 degrees relative to the surface plane, such as light at grazing angles as defined previously; alternately stated, dichroic surfaces are typically not used with light at angles exceeding about 60 degrees relative to a normal to the surface.

Figure 2C:
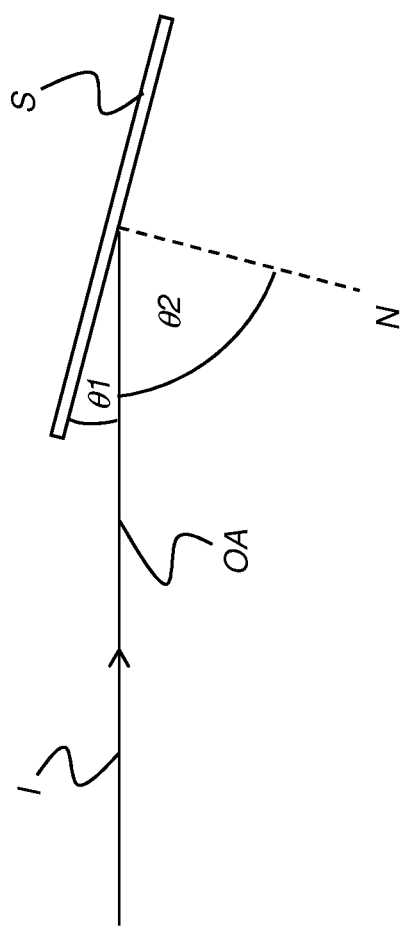
FIG. 2C is a schematic diagram that shows how incidence at a grazing angle can be expressed for a surface in the path of incident light.

For clarification, the schematic diagram of FIG. 2C shows how incidence at a grazing angle can be expressed for a surface S in the path of incident light I. Angle θ1 is the angle between incident light I in a propagation direction along an optical axis OA and surface S. Angle θ2 is the angle between the incident light I and a normal N to surface S. For embodiments of the present invention, grazing incidence occurs when angle θ1 is less than 30 degrees, so that angle θ2 of the light with respect to normal N exceeds 60 degrees. According to an embodiment of the present invention, grazing incidence is provided wherein angle θ1 is less than 20 degrees, so that angle θ2 exceeds 70 degrees. According to another embodiment of the present invention, grazing incidence is provided wherein angle θ1 is near 10 degrees, so that angle θ2 is near 80 degrees. Embodiments of the present invention can provide separation of image content according to wavelength bands with angles of grazing incidence θ1 as low as about 7 degrees.

Figure 3A:
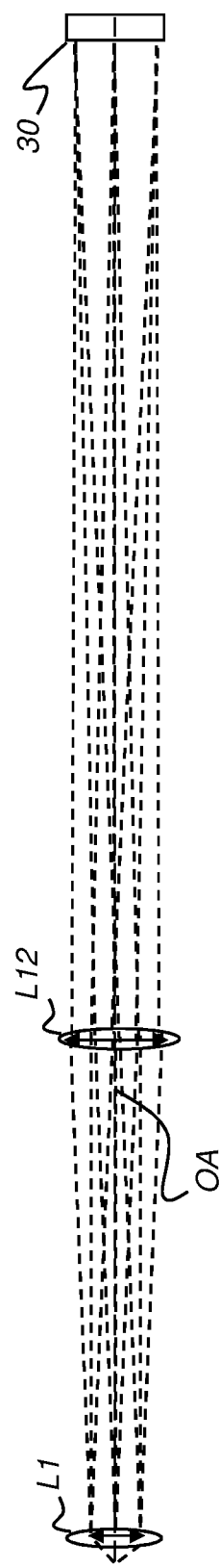
FIG. 3A is a schematic diagram showing a simplified optical path for a conventional fluorescence microscope.

The schematic view of FIG. 3A shows a simplified optical path for a conventional fluorescence microscope. Objective lens L1 directs image-bearing light to a tube lens L12 for forming an image of the sample on detector 30, typically a CCD (charge-coupled diode) or CMOS (complementary metal-oxide semiconductor) sensor array or other imaging device. In conventional practice, as shown in FIG. 3A, lenses L1 and L12 are designed to provide the image over the full sensing area of detector 30.

Figure 3B:
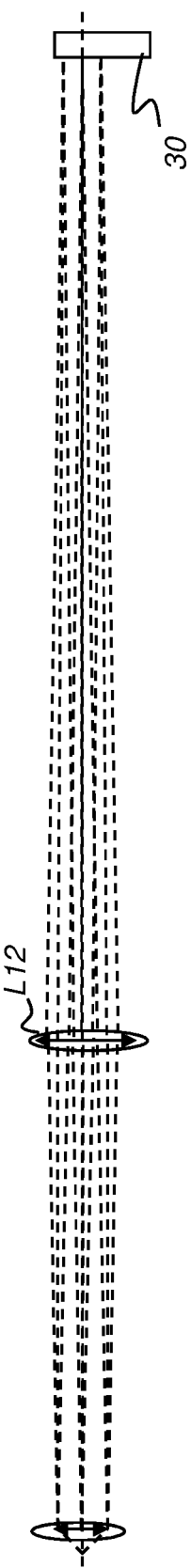
FIG. 3B is a schematic diagram showing a simplified optical path for a fluorescence microscope, with a narrower beam width of the image-bearing light.

FIG. 3B shows an alternate embodiment of the optical path for a fluorescence microscope, used when providing an image that is roughly half the size of detector 30. Here, the beam width is reduced in size. The smaller beam results from collection of light from a smaller area on the object.

Figure 4A:
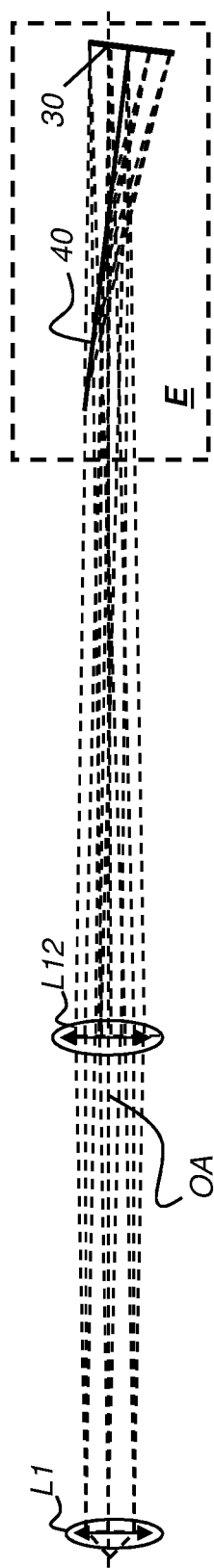
FIG. 4A is a schematic diagram showing a dichroic surface at grazing incidence to the path of image-bearing light.
Figure 4B:
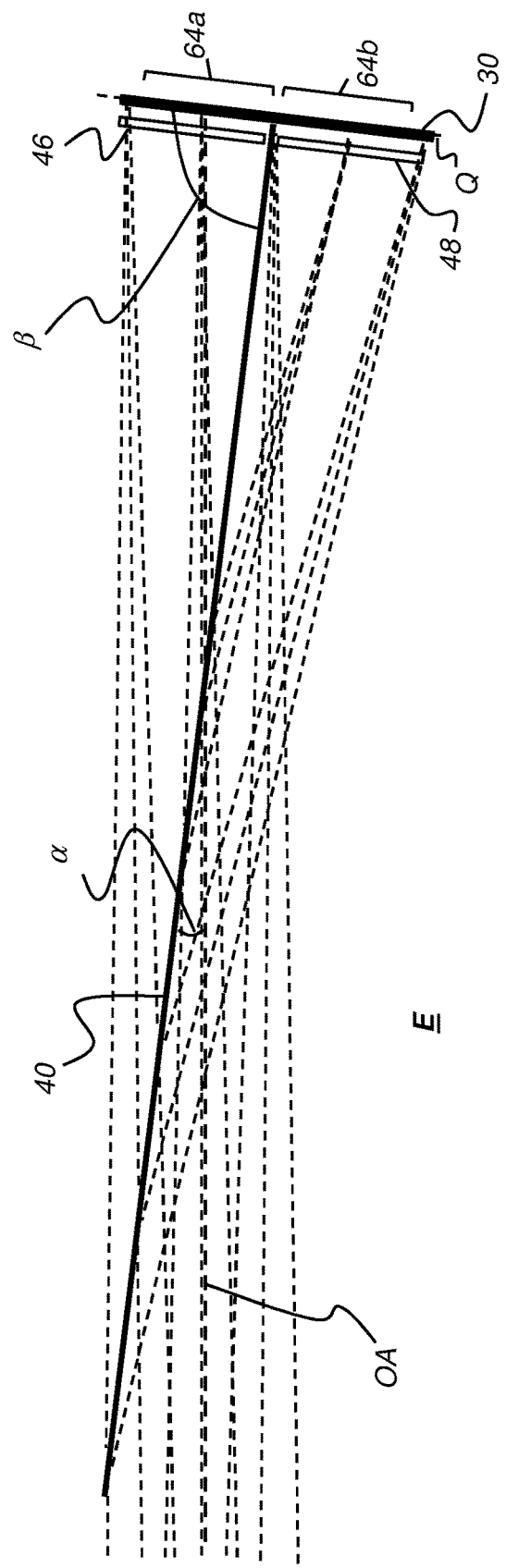
FIG. 4B is a schematic diagram that shows the enlarged beam splitter of the FIG. 4A arrangement.

The schematic diagram of FIG. 4A and enlarged partial view in enlarged area E of FIG. 4B show an embodiment of the present invention using a dichroic surface 40 in the path of the narrowed beam of image-bearing light from tube lens L12 for separating spectral components of the image-bearing light beam. Dichroic surface 40 is at a grazing angle of incidence α of not more than 30 degrees from the direction of light propagation along optical axis OA. Dichroic surface 40 splits the image-bearing incident light according to wavelength ranges into a first image 64a and a second image 64b, both images formed at detector circuitry disposed along an image plane Q. Relative to a normal to dichroic surface 40, the angle of incidence of image-bearing light is 60 degrees or more. The angle of dichroic surface 40 relative to image plane Q or image detector 30, shown as angle β in FIG. 4B, is orthogonal to within +/−15 degrees; according to alternate embodiments of the present invention, angle β is closer to 90 degrees, so that dichroic surface 40 is orthogonal to detector 30 to within +/−10 degrees or to within +/−5 degrees or less. Image detector 30 is correspondingly oblique with respect to the optical axis OA. A first image 64a of at least a first wavelength range is formed on one portion of detector 30; a second image 64b of a second wavelength range is formed on the adjacent portion of detector 30. Images 64a and 64b may be immediately adjacent on detector 30 or may be separated by one or more boundary rows of pixels. Dichroic surface 40 can be designed to have any number of suitable wavelength pass characteristics, so that dichroic surface 40 acts as a long wavelength pass (LWP) filter, a short wavelength pass (SWP) filter, a band pass filter, or a multiple band pass filter.

Dichroic surface 40 is formed on a glass plate or other sheet surface in an embodiment of the present invention. Optional filters 46 and 48 are provided for further isolation of the respective images in each wavelength range.

Figure 5A:
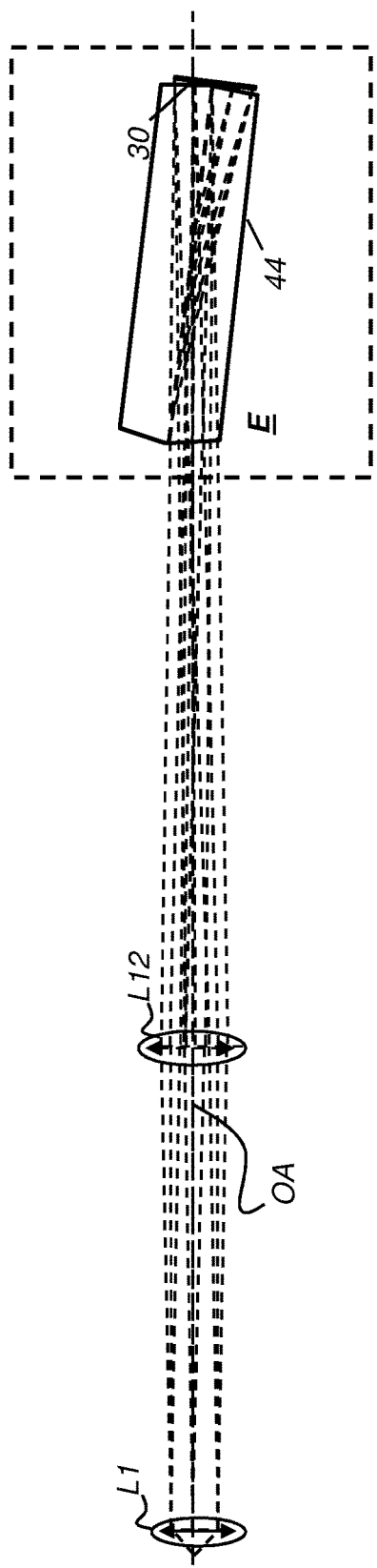
FIG. 5A is a schematic diagram showing an alternate embodiment with an embedded dichroic surface at grazing incidence to the path of image-bearing light.
Figure 5B:
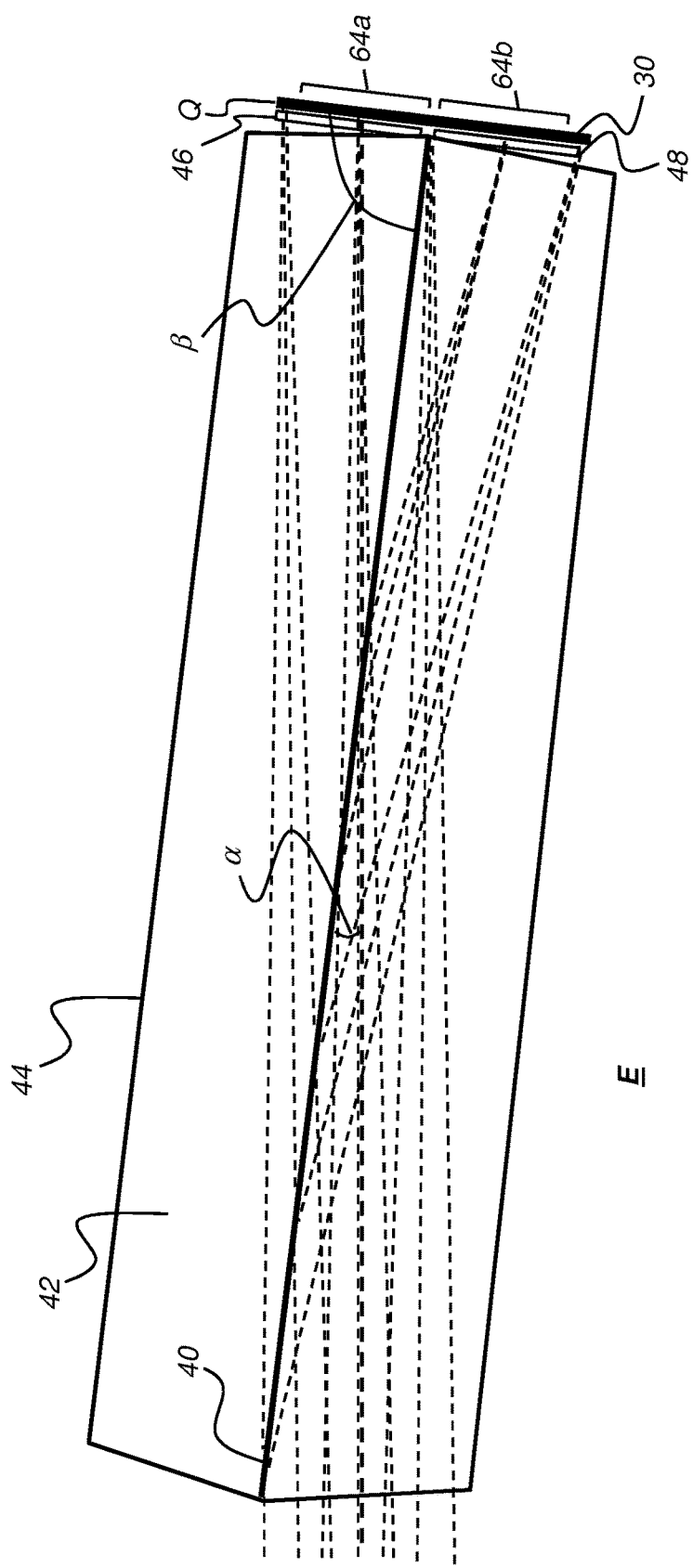
FIG. 5B is a schematic diagram that shows the enlarged embedded beam splitter of the FIG. 5A arrangement.

In an alternate embodiment of the present invention, as shown in the schematic diagrams of FIGS. 5A and 5B, dichroic surface 40 is embedded within a glass substrate 42 or other transparent substrate 42, forming an embedded image splitting element 44. Optional filters 46, 48 can be coated onto or attached to surfaces of substrate 42 or may be separately disposed.

Figure 5C:
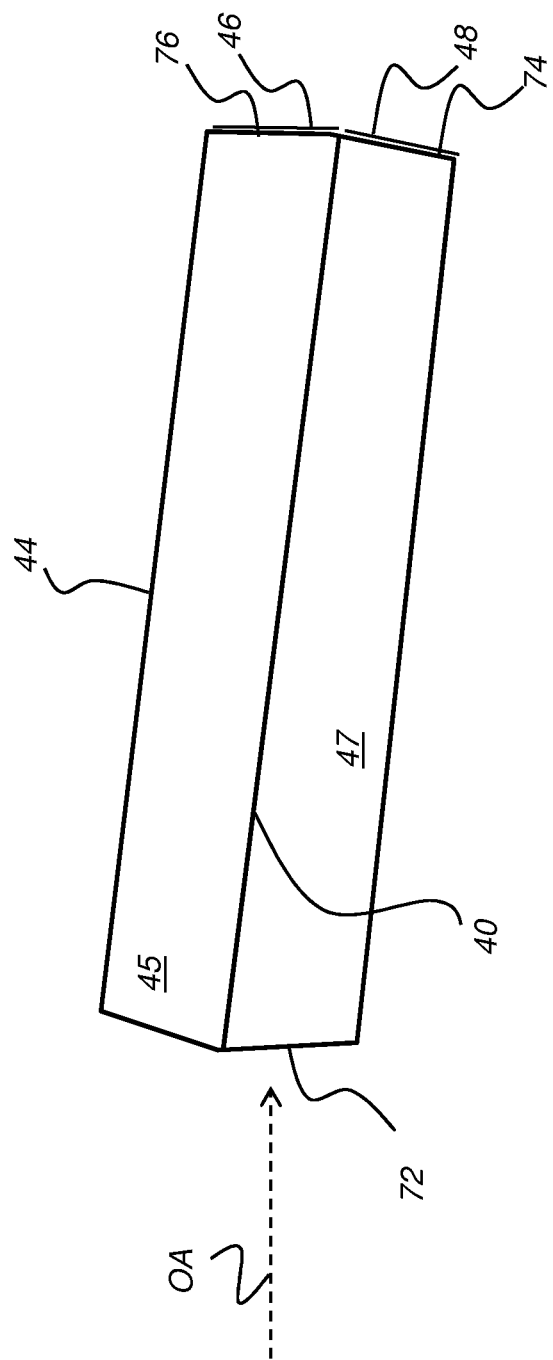
FIG. 5C is a schematic diagram that shows surfaces and components of the image splitting element formed as a composite prism.

The side view of FIG. 5C shows surfaces and components of image splitting element 44, formed as a composite prism. Dichroic surface 40 is formed along the interface between two optical prisms 45 and 47, such as on the surface of either prism. The image-bearing light from tube lens L12 is incident on a surface 72 that is substantially orthogonal to the optical axis OA. This light is then incident at a grazing angle on embedded dichroic surface 40. The light of each wavelength band is then directed to one of two output surfaces 74 and 76. In the embodiment shown in FIG. 5C, filters 46 and 48 are optionally formed on output surfaces 74 and 76.

It should be noted that embodiments of the present invention using embedded image splitting element 44 extend the back focal distance of tube lens L12 by a short distance.

Figure 6A:
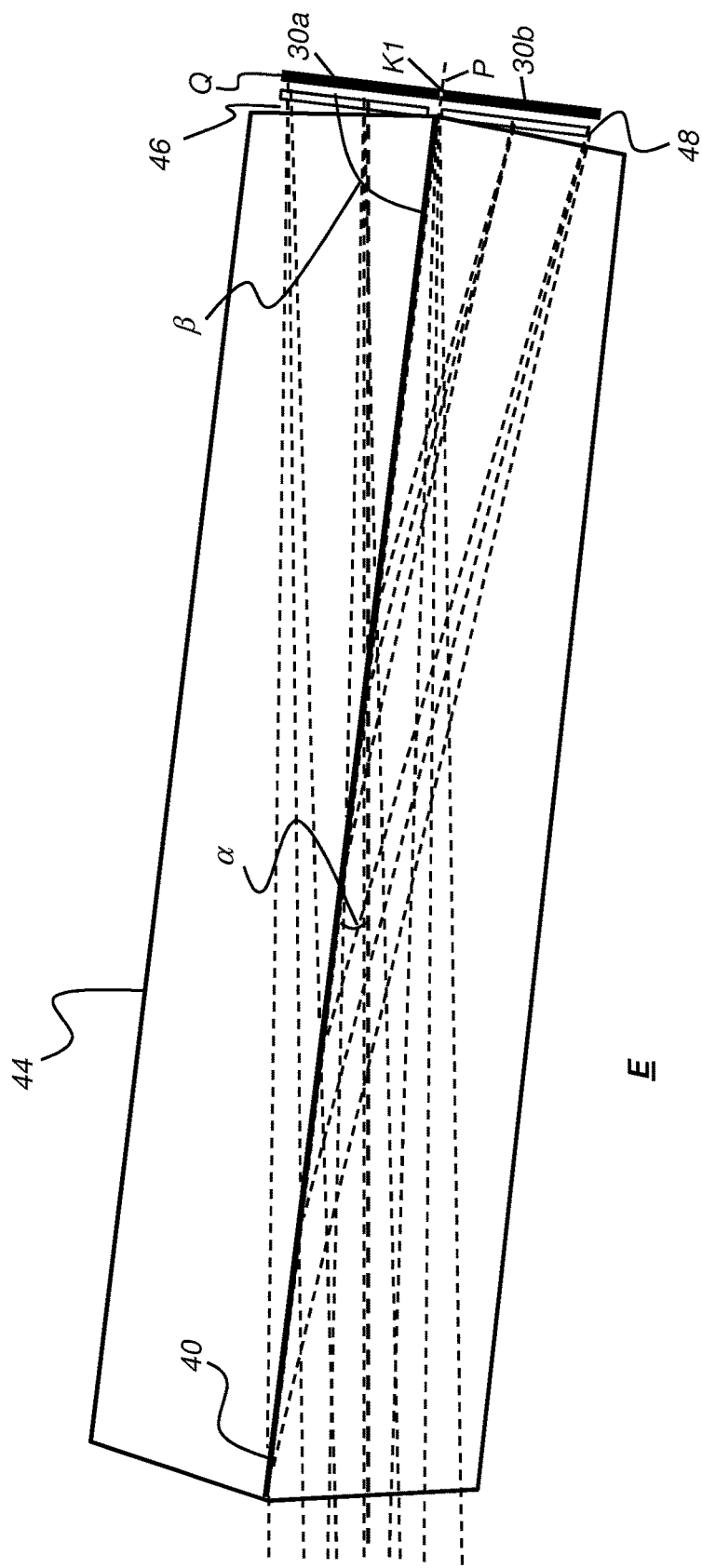
FIG. 6A is a schematic diagram showing an alternate embodiment of the present invention that uses two adjacent image detectors.

FIG. 6A is a schematic diagram showing an alternate embodiment of the present invention that uses two adjacent image detectors 30a and 30b instead of a single detector. Image splitting element 44 transmits light of at least a first wavelength range to form a first image on first image detector 30a and reflects light of a second wavelength range to form a second image on a second image detector 30b. Dichroic surface 40 lies in a plane P that is orthogonal to image plane Q and thus orthogonal to each image detector 30a and 30b, to within +/−10 degrees. There is a line of intersection K1 defined by extending plane P into the image plane Q; this line of intersection K1 corresponds to a boundary between image content at image detectors 30a and 30b.

Figure 6B:
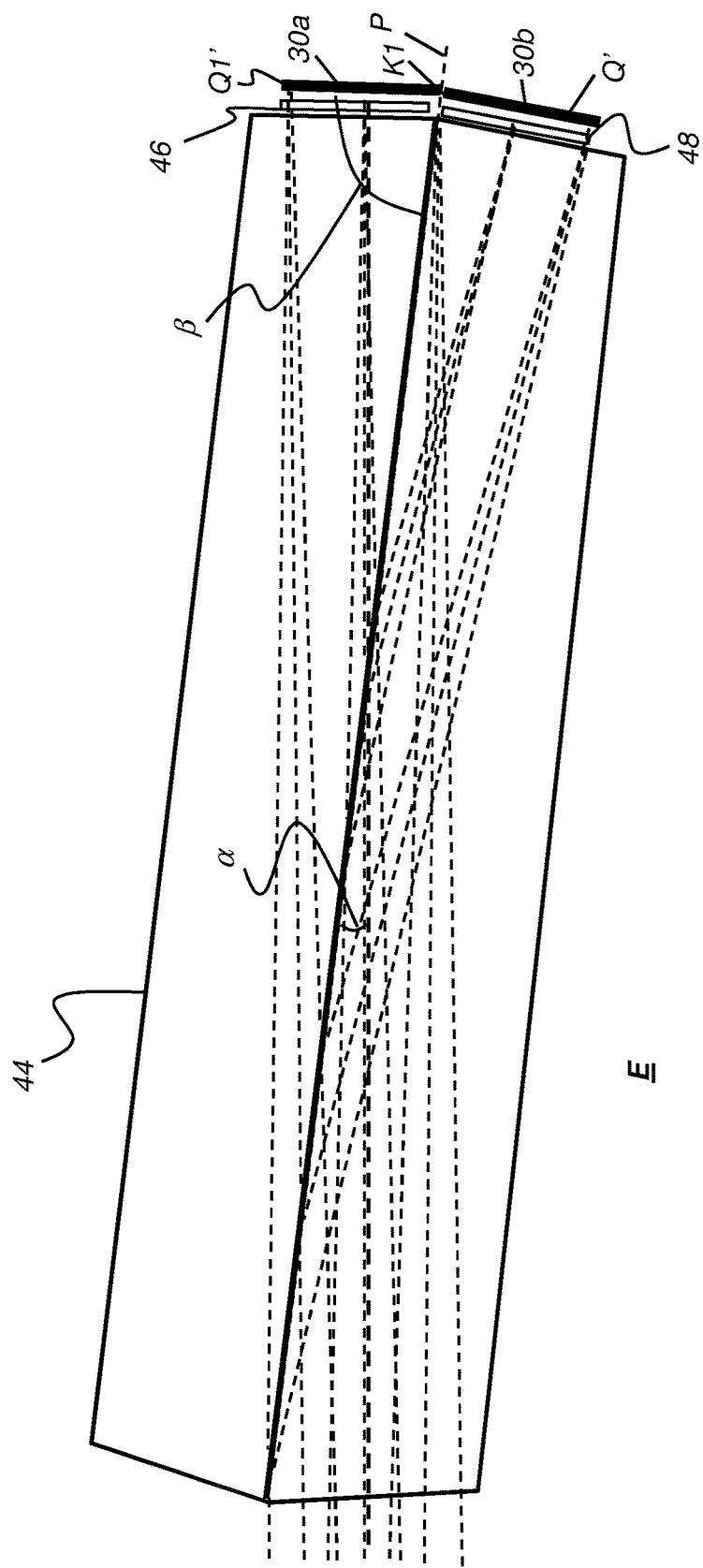
FIG. 6B is a schematic diagram showing an alternate embodiment of the present invention that uses two adjacent image detectors that are substantially in parallel.

FIG. 6B is a schematic diagram showing an alternate embodiment of the present invention in which image detectors 30a and 30b are substantially in parallel, as described herein, but are slightly folded inward, along line of intersection K1, toward image splitting element 44 by a few degrees, disposed along substantially parallel image planes Q' and Q1' in slightly modified form. This arrangement positions image detectors 30a and 30b and corresponding filters 46 and 48 so that they are more nearly parallel to the output faces of image splitting element 44. This arrangement allows a measure of compensation for slight focus differences between the two images; however, this difference is negligible in some embodiments of the present invention.

Figure 7:
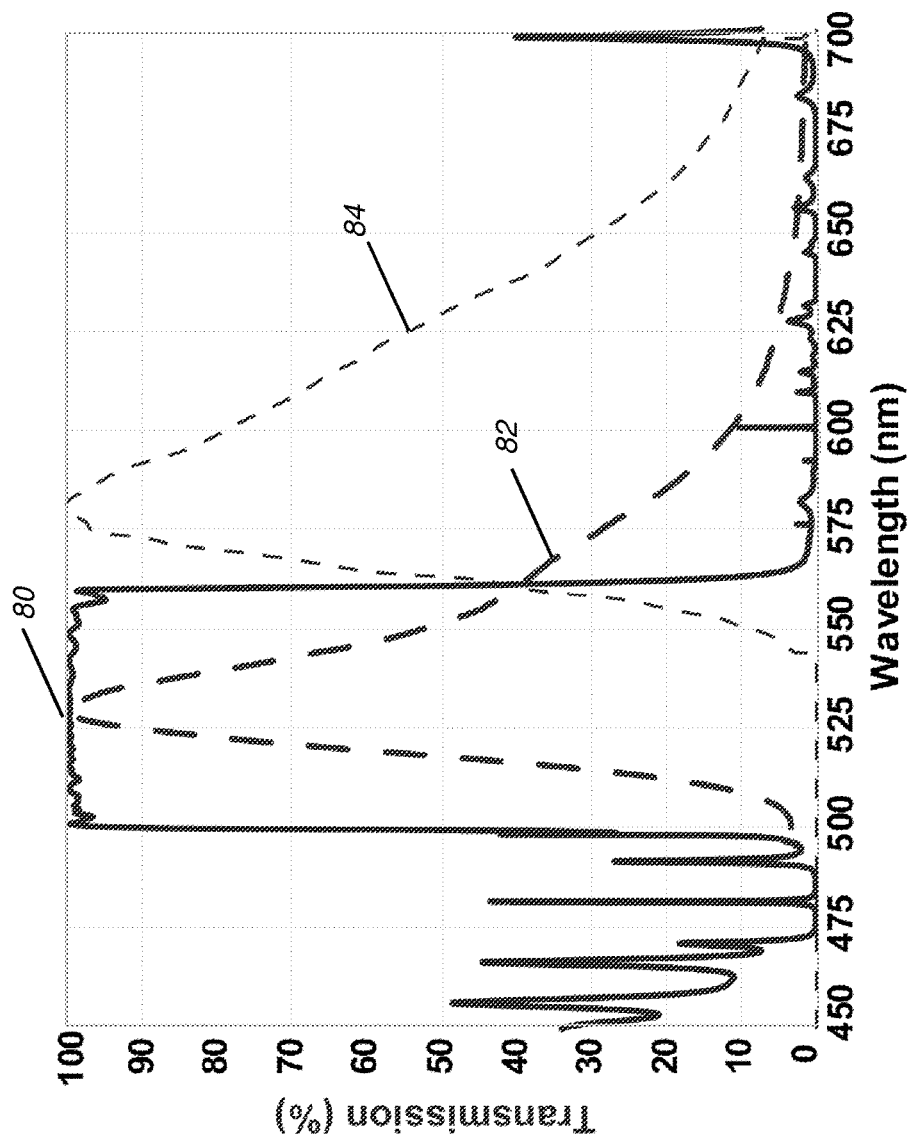
FIG. 7 is a graph showing a dichroic filter characteristic at a grazing incidence angle according to an embodiment of the present invention.

FIG. 7 is a graph showing a dichroic filter characteristic 80 at a grazing incidence angle according to an embodiment of the present invention. Here, characteristic 80 has the behavior of a band pass filter. By way of reference, dashed line curves 82 and 84 show the emission characteristics of first and second fluorophore materials.

Fabrication

In general, thin-film interference filters are treated or formed to be wavelength-selective as a result of the interference effects that take place between incident and reflected waves at boundaries between interleaved layers of materials having different refractive indices. Interference filters conventionally include a dielectric stack composed of multiple alternating layers of two or more dielectric materials having different refractive indices. Moreover, in a conventional thin-film interference filter, each of the respective interleaved layers of the filter stack is very thin, e.g., having an optical thickness (physical thickness times the refractive index of the layer) on the order of a quarter wavelength of light. These layers may be deposited on one or more substrates (e.g., a glass substrate) and may be interleaved in various configurations to provide one or more band-pass, or band-rejection filter characteristics. A filter that substantially reflects at least one band of wavelengths and substantially transmits at least a second band of wavelengths immediately adjacent to the first band, such that the filter enables separation of the two bands of wavelengths by redirecting the reflected band, is conventionally called a "dichroic beam splitter," or simply a "dichroic" filter.

Optical filters formed or configured according to embodiments of the present invention generally employ the basic structure of a thin film interference filter. In this basic structure, a plurality of discrete layers of material are deposited onto a surface of a substrate in some alternating or otherwise interleaved pattern as a filter stack, wherein the optical index between individual layers in the filter stack changes abruptly, rather than continuously or gradually. The plurality of layers include at least a plurality of first layers having a first refractive index, $n_L$ interleaved with a plurality of second layers having a second refractive index, $n_H$, greater than the first refractive index. One or more additional layers having refractive indices not equal to either $n_H$ or $n_L$ may also be in the filter stack. In conventional thin film designs, two discrete layers are alternated, formed with thicknesses very near the quarter-wavelength thickness of some fundamental wavelength. In embodiments of the present invention, the addition of a third material or other additional materials in the thin film stack helps to fine-tune filter response. The numerical differences between the index of refraction in the high and low index materials affects the number of layers required for forming a filter with a particular transmittance characteristic. Generally, where there is a small difference between the indices of refraction for the high and low index materials, a higher number of alternating layers must be used to achieve a particular transmittance (or optical density). Where the difference between the indices of refraction in the high and low index materials is larger, fewer alternating layers are needed for achieving the same transmittance (density) values.

A wide variety of materials may be used to form the plurality of discrete material layers in the filter stack. Among such materials, non-limiting mention is made of metals, metallic and non-metallic oxides, transparent polymeric materials, and so-called "soft" coatings, such as sodium aluminum fluoride ($Na_3AlF_6$) and zinc sulfide (ZnS). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum pentoxide ($Al_2O_5$).

In some embodiments, the plurality of interleaved material layers may include at least two distinct materials. As a non-limiting example, the filters according to the present disclosure may include a plurality of distinct alternating $Nb_2O_5$ and $SiO_2$ layers which have indices of refraction of 2.3 and 1.5, respectively. Alternatively, the filters in accordance with the present disclosure may use an interleaved pattern with at least three distinct materials, such as distinct $Nb_2O_5$, $SiO_2$, and $Ta_2O_5$ layers, each layer having a characteristic index of refraction. Of course, more than three materials and other combinations of materials may also be used within the interleaved layer pattern.

Generally, the filters in accordance with the present disclosure can be manufactured using deposition methods and techniques that are known in the art. For example, these filters may be made with a computer controlled ion beam sputtering system, such as is described in commonly assigned U.S. Pat. No. 7,068,430, which is incorporated herein by reference. In general, such a system is capable of depositing a plurality of discrete alternating material layers, wherein the thickness of each layer may be precisely controlled.

Filter designs that specify the layer arrangement in accordance with the present disclosure may be produced by known thin-film filter design techniques. For example, these filter designs may be produced by optimizing the filter spectra and structure of an initial design, such as a traditional multicavity Fabry Perot narrow band pass interference filter, against a target spectrum using known optical optimization routines. Non-limiting examples of such optimization routines include the variable-metric or simplex methods implemented in standard commercial thin-film design software packages, such as TFCalc by Software Spectra, Inc. of Portland, Oreg., and The Essential Macleod by Thin Film Center, Inc., of Tucson, Ariz. A detailed description of filter design techniques that can be used to produce filter designs according to the present disclosure may be found in U.S. Pat. No. 7,068,430, as noted previously.

The layer structure for the dichroic image splitting surface with the spectral characteristic of FIG. 7 is provided subsequently in Table 1. As noted previously, dichroic surface 40 can be an interference filter of any of a number of types, including SWP, LWP, band pass, or multiple band pass filter, for example.

According to an alternate embodiment of the present invention, dichroic surface 40 is designed as a band pass filter in an optical configuration in which light outside the pass band is discarded. Referring to FIG. 6A, for example, light of the desired pass band goes to detector 30a; detector 30b is not used and is replaced by a beam dump.

Embodiments of the present invention are advantageous for applications such as fluorescence microscopy using multiple fluorophores, for example. An advantage provided by the thin film interference filter design for light at grazing angle incidence relates to high rejection levels for light outside the intended transmission band or bands. Rejection relates to the blocking ability of a filter and is expressed in optical density (OD), where, for transmission T, OD=$-\log_{10}$(T), so that -60 dB rejection is OD 6. Conventional dichroic beam splitter designs, as described in the background section, typically provide rejection of no better than about OD 1.5. This is, in large part, due to differences in how light of different polarizations behaves at near 45 degree incidence. By comparison, embodiments of the present invention are capable of higher rejection levels, greater than OD 3 in some embodiments and even approaching or better than about OD 6 with light at grazing incidence. High rejection levels reduce the demands on emission filters (46 and 48 in FIGS. 4B and 5B-6B) and can even allow one or both of these filters to be optional. According to an embodiment of the present invention, well less than 10% of the light that transmits through the dichroic coated surface is light of the unwanted wavelength range(s) and less than 10% of the light that is reflected from the coated surface is light of the wavelength(s) intended for transmission. According to another embodiment of the present invention, rejection of OD 3 is provided, so that no more than 0.1% of the light that transmits through the dichroic coated surface is light of the unwanted wavelength range(s). According to another embodiment of the present invention, the dichroic surface is designed as a band pass filter. Out-of-band rejection levels approach or exceed OD 6. Thus, less than about 0.0001% of the light that transmits through the dichroic coated surface is light of the unwanted wavelength range(s).

Unlike conventional beam splitters, the image splitter of embodiments of the present invention provides images having different spectral content with incident light at a grazing angle. This arrangement allows a single image detector to obtain both images of different spectral content or, alternately, allows the use of two adjacent image detectors. The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

TABLES

TABLE 1

Dichroic Surface Layer Arrangement
Coating Thickness (μm): 16.349
NB2O5 (μm): 6.234
SIO2 (μm): 10.114
Number of Layers: 201

| Layer | Material | Thickness (nm) | Accumulated (μm) |
|---|---|---|---|
| 1 | NB2O5 | 12.13300342 | 0.0121 |
| 2 | SIO2 | 136.56480262 | 0.1487 |
| 3 | NB2O5 | 105.19122086 | 0.2539 |
| 4 | SIO2 | 109.93057811 | 0.3638 |
| 5 | NB2O5 | 35.50481941 | 0.3993 |
| 6 | SIO2 | 79.52943594 | 0.4789 |
| 7 | NB2O5 | 103.46562405 | 0.5823 |
| 8 | SIO2 | 119.43444818 | 0.7018 |
| 9 | NB2O5 | 45.85088574 | 0.7476 |
| 10 | SIO2 | 64.84444455 | 0.8124 |
| 11 | NB2O5 | 81.12169754 | 0.8936 |
| 12 | SIO2 | 127.23637213 | 1.0208 |
| 13 | NB2O5 | 50.96814714 | 1.0718 |
| 14 | SIO2 | 105.50438804 | 1.1773 |
| 15 | NB2O5 | 49.89240806 | 1.2272 |
| 16 | SIO2 | 116.97091408 | 1.3441 |
| 17 | NB2O5 | 53.9223275 | 1.3981 |
| 18 | SIO2 | 129.62526804 | 1.5277 |
| 19 | NB2O5 | 53.42470785 | 1.5811 |
| 20 | SIO2 | 114.02162743 | 1.6951 |
| 21 | NB2O5 | 46.04365123 | 1.7412 |
| 22 | SIO2 | 110.38818059 | 1.8516 |
| 23 | NB2O5 | 62.15857358 | 1.9137 |
| 24 | SIO2 | 136.97941752 | 2.0507 |
| 25 | NB2O5 | 53.94463008 | 2.1047 |
| 26 | SIO2 | 87.60207679 | 2.1923 |
| 27 | NB2O5 | 51.54010068 | 2.2438 |
| 28 | SIO2 | 128.88824105 | 2.3727 |
| 29 | NB2O5 | 60.45663442 | 2.4331 |
| 30 | SIO2 | 130.17660285 | 2.5633 |
| 31 | NB2O5 | 48.18311945 | 2.6115 |
| 32 | SIO2 | 99.46016927 | 2.711 |
| 33 | NB2O5 | 51.26401495 | 2.7622 |

TABLE 1-continued

Dichroic Surface Layer Arrangement
Coating Thickness (μm): 16.349
NB2O5 (μm): 6.234
SIO2 (μm): 10.114
Number of Layers: 201

| Layer | Material | Thickness (nm) | Accumulated (μm) |
|---|---|---|---|
| 34 | SIO2 | 137.45005855 | 2.8997 |
| 35 | NB2O5 | 59.12107943 | 2.9588 |
| 36 | SIO2 | 123.04736832 | 3.0818 |
| 37 | NB2O5 | 47.0040482 | 3.1288 |
| 38 | SIO2 | 101.76443361 | 3.2306 |
| 39 | NB2O5 | 53.8276632 | 3.2844 |
| 40 | SIO2 | 132.49526528 | 3.4169 |
| 41 | NB2O5 | 61.93630516 | 3.4789 |
| 42 | SIO2 | 107.13580575 | 3.586 |
| 43 | NB2O5 | 49.68597111 | 3.6357 |
| 44 | SIO2 | 99.60156678 | 3.7353 |
| 45 | NB2O5 | 53.88844507 | 3.7892 |
| 46 | SIO2 | 122.29512812 | 3.9115 |
| 47 | NB2O5 | 81.87318843 | 3.9933 |
| 48 | SIO2 | 80.15412173 | 4.0735 |
| 49 | NB2O5 | 43.39439352 | 4.1169 |
| 50 | SIO2 | 98.8597627 | 4.2158 |
| 51 | NB2O5 | 98.38891915 | 4.3141 |
| 52 | SIO2 | 82.80895411 | 4.397 |
| 53 | NB2O5 | 44.89086912 | 4.4418 |
| 54 | SIO2 | 114.0222875 | 4.5559 |
| 55 | NB2O5 | 82.10374875 | 4.638 |
| 56 | SIO2 | 84.18727763 | 4.7222 |
| 57 | NB2O5 | 36.73860443 | 4.7589 |
| 58 | SIO2 | 149.88160381 | 4.9088 |
| 59 | NB2O5 | 92.17040016 | 5.0009 |
| 60 | SIO2 | 107.01116971 | 5.108 |
| 61 | NB2O5 | 34.13461534 | 5.1421 |
| 62 | SIO2 | 110.25143593 | 5.2523 |
| 63 | NB2O5 | 84.60827301 | 5.337 |
| 64 | SIO2 | 120.35480417 | 5.4573 |
| 65 | NB2O5 | 39.65801845 | 5.497 |
| 66 | SIO2 | 95.53105952 | 5.5925 |
| 67 | NB2O5 | 85.61458007 | 5.6781 |
| 68 | SIO2 | 119.14616299 | 5.7973 |
| 69 | NB2O5 | 32.02840156 | 5.8293 |
| 70 | SIO2 | 121.63193964 | 5.9509 |
| 71 | NB2O5 | 87.19274292 | 6.0381 |
| 72 | SIO2 | 130.9356328 | 6.169 |
| 73 | NB2O5 | 29.24988019 | 6.1983 |
| 74 | SIO2 | 109.81458896 | 6.3081 |
| 75 | NB2O5 | 94.38635433 | 6.4025 |
| 76 | SIO2 | 113.87144232 | 6.5164 |
| 77 | NB2O5 | 37.06350437 | 6.5534 |
| 78 | SIO2 | 98.36608303 | 6.6518 |
| 79 | NB2O5 | 80.17552826 | 6.732 |
| 80 | SIO2 | 113.63428797 | 6.8456 |
| 81 | NB2O5 | 40.49583036 | 6.8861 |
| 82 | SIO2 | 79.43161201 | 6.9655 |
| 83 | NB2O5 | 97.45028226 | 7.063 |
| 84 | SIO2 | 118.01962154 | 7.181 |
| 85 | NB2O5 | 40.60719438 | 7.2216 |
| 86 | SIO2 | 87.65585544 | 7.3093 |
| 87 | NB2O5 | 78.56449545 | 7.3878 |
| 88 | SIO2 | 105.24813117 | 7.4931 |
| 89 | NB2O5 | 44.6768247 | 7.5378 |
| 90 | SIO2 | 95.21167323 | 7.633 |
| 91 | NB2O5 | 68.08352353 | 7.7011 |
| 92 | SIO2 | 96.91788288 | 7.798 |
| 93 | NB2O5 | 50.72098285 | 7.8487 |
| 94 | SIO2 | 91.70636041 | 7.9404 |
| 95 | NB2O5 | 62.19064545 | 8.0026 |
| 96 | SIO2 | 96.43924108 | 8.099 |
| 97 | NB2O5 | 62.15666569 | 8.1612 |
| 98 | SIO2 | 88.725655 | 8.2499 |
| 99 | NB2O5 | 59.29509264 | 8.3092 |
| 100 | SIO2 | 96.24074389 | 8.4054 |
| 101 | NB2O5 | 60.4223968 | 8.4659 |
| 102 | SIO2 | 87.77105283 | 8.5536 |
| 103 | NB2O5 | 67.54728926 | 8.6212 |
| 104 | SIO2 | 102.50046719 | 8.7237 |

TABLE 1-continued

Dichroic Surface Layer Arrangement
Coating Thickness (μm): 16.349
NB2O5 (μm): 6.234
SIO2 (μm): 10.114
Number of Layers: 201

| Layer | Material | Thickness (nm) | Accumulated (μm) |
|---|---|---|---|
| 105 | NB2O5 | 59.11595012 | 8.7828 |
| 106 | SIO2 | 81.65379492 | 8.8645 |
| 107 | NB2O5 | 61.08184136 | 8.9255 |
| 108 | SIO2 | 99.83699111 | 9.0254 |
| 109 | NB2O5 | 71.06862545 | 9.0964 |
| 110 | SIO2 | 88.97540985 | 9.1854 |
| 111 | NB2O5 | 59.5568431 | 9.245 |
| 112 | SIO2 | 89.40316338 | 9.3344 |
| 113 | NB2O5 | 62.08644712 | 9.3965 |
| 114 | SIO2 | 90.01841384 | 9.4865 |
| 115 | NB2O5 | 67.99098177 | 9.5545 |
| 116 | SIO2 | 91.94254761 | 9.6464 |
| 117 | NB2O5 | 65.34547052 | 9.7118 |
| 118 | SIO2 | 92.27398817 | 9.804 |
| 119 | NB2O5 | 57.45666494 | 9.8615 |
| 120 | SIO2 | 83.72282159 | 9.9452 |
| 121 | NB2O5 | 70.50700486 | 10.0157 |
| 122 | SIO2 | 104.40275996 | 10.1201 |
| 123 | NB2O5 | 60.24252445 | 10.1804 |
| 124 | SIO2 | 83.40146152 | 10.2638 |
| 125 | NB2O5 | 66.62788869 | 10.3304 |
| 126 | SIO2 | 97.04424739 | 10.4274 |
| 127 | NB2O5 | 52.49034055 | 10.4799 |
| 128 | SIO2 | 92.59636839 | 10.5725 |
| 129 | NB2O5 | 84.74382459 | 10.6573 |
| 130 | SIO2 | 96.00442336 | 10.7533 |
| 131 | NB2O5 | 47.04394142 | 10.8003 |
| 132 | SIO2 | 89.66166931 | 10.89 |
| 133 | NB2O5 | 83.22186641 | 10.9732 |
| 134 | SIO2 | 88.61094081 | 11.0618 |
| 135 | NB2O5 | 45.67864564 | 11.1075 |
| 136 | SIO2 | 99.55680689 | 11.2071 |
| 137 | NB2O5 | 105.94516283 | 11.313 |
| 138 | SIO2 | 91.70294582 | 11.4047 |
| 139 | NB2O5 | 33.78792506 | 11.4385 |
| 140 | SIO2 | 94.42802897 | 11.5329 |
| 141 | NB2O5 | 114.14669337 | 11.6471 |
| 142 | SIO2 | 110.21013622 | 11.7573 |
| 143 | NB2O5 | 43.97282236 | 11.8012 |
| 144 | SIO2 | 79.39078449 | 11.8806 |
| 145 | NB2O5 | 77.78532895 | 11.9584 |
| 146 | SIO2 | 90.83880903 | 12.0493 |
| 147 | NB2O5 | 48.33969958 | 12.0976 |
| 148 | SIO2 | 96.71109728 | 12.1943 |
| 149 | NB2O5 | 81.71863281 | 12.276 |
| 150 | SIO2 | 87.70536051 | 12.3637 |
| 151 | NB2O5 | 46.06208991 | 12.4098 |
| 152 | SIO2 | 92.25034084 | 12.5021 |
| 153 | NB2O5 | 73.3294936 | 12.5754 |
| 154 | SIO2 | 92.6305229 | 12.668 |
| 155 | NB2O5 | 62.04287091 | 12.7301 |
| 156 | SIO2 | 89.72715124 | 12.8198 |
| 157 | NB2O5 | 54.70530059 | 12.8745 |
| 158 | SIO2 | 88.17494698 | 12.9627 |
| 159 | NB2O5 | 68.86582347 | 13.0315 |
| 160 | SIO2 | 96.11054401 | 13.1276 |
| 161 | NB2O5 | 65.10569428 | 13.1927 |
| 162 | SIO2 | 89.61891435 | 13.2824 |
| 163 | NB2O5 | 55.93281112 | 13.3383 |
| 164 | SIO2 | 84.37723117 | 13.4227 |
| 165 | NB2O5 | 67.58569409 | 13.4903 |
| 166 | SIO2 | 100.11073416 | 13.5904 |
| 167 | NB2O5 | 70.81052178 | 13.6612 |
| 168 | SIO2 | 81.12046355 | 13.7423 |
| 169 | NB2O5 | 52.74630117 | 13.795 |
| 170 | SIO2 | 90.97647891 | 13.886 |
| 171 | NB2O5 | 69.98953885 | 13.956 |
| 172 | SIO2 | 90.14714225 | 14.0462 |
| 173 | NB2O5 | 64.11095367 | 14.1103 |
| 174 | SIO2 | 83.94143105 | 14.1942 |
| 175 | NB2O5 | 53.09137398 | 14.2473 |
| 176 | SIO2 | 92.01801387 | 14.3393 |
| 177 | NB2O5 | 68.76541823 | 14.4081 |
| 178 | SIO2 | 87.02863609 | 14.4951 |
| 179 | NB2O5 | 63.61019637 | 14.5587 |
| 180 | SIO2 | 93.0014373 | 14.6517 |
| 181 | NB2O5 | 51.46678556 | 14.7032 |
| 182 | SIO2 | 85.40577055 | 14.7886 |
| 183 | NB2O5 | 81.11966268 | 14.8697 |
| 184 | SIO2 | 103.04775869 | 14.9728 |
| 185 | NB2O5 | 54.75608845 | 15.0275 |
| 186 | SIO2 | 80.26881088 | 15.1078 |
| 187 | NB2O5 | 68.15419148 | 15.1759 |
| 188 | SIO2 | 95.36889911 | 15.2713 |
| 189 | NB2O5 | 58.78582506 | 15.3301 |
| 190 | SIO2 | 87.10092718 | 15.4172 |
| 191 | NB2O5 | 79.18715941 | 15.4964 |
| 192 | SIO2 | 97.75710711 | 15.5941 |
| 193 | NB2O5 | 44.69236289 | 15.6388 |
| 194 | SIO2 | 83.46653025 | 15.7223 |
| 195 | NB2O5 | 91.7892229 | 15.8141 |
| 196 | SIO2 | 127.12040273 | 15.9412 |
| 197 | NB2O5 | 39.39829991 | 15.9806 |
| 198 | SIO2 | 71.23438014 | 16.0518 |
| 199 | NB2O5 | 92.18180183 | 16.144 |
| 200 | SIO2 | 194.96613803 | 16.339 |
| 201 | NB2O5 | 9.5322825 | 16.3485 |

The invention claimed is:

1. A spectral splitting apparatus comprising:
an image plane that intersects an optical axis at an oblique angle; and
a coated dichroic surface that is orthogonal to the image plane to within +/−15 degrees, the coated dichroic surface having a plurality of layers of material, the plurality of layers including layers having a first refractive index, $n_L$, and layers having a second refractive index, $n_H$, greater than the first refractive index, wherein the coated dichroic surface intersects the optical axis at a grazing angle of 15 degrees or less relative to the optical axis, wherein the plurality of layers of material impart a spectral characteristic that, for an image-bearing light that is incident along the optical axis at the grazing angle, transmits light of at least a first wavelength range to form a first image at the image plane and reflects light outside the first wavelength range, to form a second image, spaced apart from the first image, at the same image plane.

2. The apparatus of claim 1 wherein the coated dichroic surface is encased within a transparent block.

3. The apparatus of claim 1 wherein the coated dichroic surface is orthogonal to the image plane to within +/−10 degrees.

4. The apparatus of claim 1 wherein there is a single image detector disposed at the image plane for detecting both first and second images.

5. The apparatus of claim 1 wherein there is a first image detector disposed at the image plane for detecting the first image and a second image detector disposed at the same image plane for detecting the second image.

6. The apparatus of claim 1 wherein less than 10% of the light that transmits through the dichroic coated surface is light of the second wavelength range.

7. The apparatus of claim 1 wherein less than 10% of the light that reflects from the dichroic coating is light of the first wavelength range.

8. The apparatus of claim 1 wherein less than 0.1% of the light that transmits through the dichroic coated surface is light of the second wavelength range.

9. The apparatus of claim 2 further comprising one or more output filters formed on one or more surfaces of the transparent block.

10. An optical image splitter having a coated dichroic surface disposed in the path of image-bearing light along an optical axis wherein the coated dichroic surface is configured to transmit light of at least a first wavelength range to form a first image at an intersection of the optical axis and an image plane that intersects the optical axis at an oblique angle and to reflect light of a second wavelength range,
wherein the coated dichroic surface is orthogonal to the image plane to within +/−10 degrees.

11. The optical image splitter of claim 10 wherein the first image is formed on a first image detector at the image plane and wherein the light of the second wavelength range forms a second image at a second image detector at the image plane.

12. The optical image splitter of claim 10 wherein the coated dichroic surface has a plurality of layers of material, the plurality of layers including layers having a first refractive index, $n_L$, and layers having a second refractive index, $n_H$, greater than the first refractive index.

13. The optical image splitter of claim 10 wherein the coated dichroic surface is encased within a transparent medium.

14. An imaging apparatus for viewing a sample, the apparatus comprising:
an optical system having an objective lens disposed to obtain light from the sample and a tube lens that directs image bearing light along an optical axis;
an optical image splitter disposed in the path of the image-bearing light along the optical axis and configured to transmit light of a first wavelength range to form a first image within a first image plane and to reflect light of a second wavelength range to form a second image within a second image plane,
wherein the first and second image planes are parallel to within +/−15 degrees, and
wherein the image splitter comprises a coated dichroic surface that is in a third plane that is orthogonal to each of the first and second image planes to within +/−10 degrees and wherein the third plane intersects the first and second image planes between the first and second images.

15. The apparatus of claim 14 wherein the image splitter is a composite prism element formed of first and second prisms with the coated dichroic surface formed along an interface of the first and second prisms.

16. The apparatus of claim 14 further comprising a single image detector that is disposed along both the first and second image planes.

17. The apparatus of claim 14 further comprising a first image detector that is disposed along the first image plane and a second image detector that is disposed along the second image plane.

18. The optical image splitter of claim 14 wherein less than 0.1% of the light that transmits through the dichroic coated surface is light of the second wavelength range.

19. An imaging apparatus comprising:
an optical system having an objective lens and a tube lens that define an optical axis;
an optical image splitter formed as a composite prism having:
a first prism element and a second prism element disposed to extend a back focal distance of the tube lens;
a dichroic surface formed along the interface between the first and second prism elements;
an incident surface substantially orthogonal to the optical axis;
first and second output surfaces that are both parallel to within +/−10 degrees of an output image plane Q,
and wherein the dichroic surface is at an angle β orthogonal to the output image plane Q to within +/−15 degrees and intersects the optical axis at an angle α of less than 30 degrees;
and
one or more image detectors disposed at the output image plane Q to obtain a first image formed by reflection of light from the optical system by the dichroic surface and a second image formed by transmission of light from the optical system by the dichroic surface.

* * * * *